US012569812B2

(12) United States Patent
Kishino et al.

(10) Patent No.: US 12,569,812 B2
(45) Date of Patent: Mar. 10, 2026

(54) BIPOLAR MEMBRANE

(71) Applicant: ASTOM Corporation, Tokyo (JP)

(72) Inventors: Masayuki Kishino, Shunan (JP);
Kouta Yuzuki, Shunan (JP); Kenji Fukuta, Shunan (JP)

(73) Assignee: ASTOM CORPORATION, Tokyo (JP)

( * ) Notice: Subject to any disclaimer, the term of this patent is extended or adjusted under 35 U.S.C. 154(b) by 697 days.

(21) Appl. No.: 17/982,998

(22) Filed: Nov. 8, 2022

(65) Prior Publication Data

US 2023/0067288 A1 Mar. 2, 2023

Related U.S. Application Data

(62) Division of application No. 16/091,918, filed as application No. PCT/JP2017/015180 on Apr. 13, 2017, now abandoned.

(30) Foreign Application Priority Data

Apr. 14, 2016 (JP) ................................. 2016-081450

(51) Int. Cl.
| | |
|---|---|
| *B01D 61/44* | (2006.01) |
| *B01D 47/12* | (2006.01) |
| *B01D 61/46* | (2006.01) |
| *B01D 69/02* | (2006.01) |
| *B01D 69/10* | (2006.01) |
| *B01D 69/12* | (2006.01) |
| *B01D 71/26* | (2006.01) |
| *B01D 71/28* | (2006.01) |
| *B01D 71/30* | (2006.01) |
| *B01J 39/04* | (2017.01) |
| *B01J 39/20* | (2006.01) |
| *B01J 41/04* | (2017.01) |
| *B01J 41/14* | (2006.01) |
| *B01J 47/12* | (2017.01) |
| *C08J 5/22* | (2006.01) |
| *C25B 13/02* | (2006.01) |
| *C25B 13/08* | (2006.01) |

(52) U.S. Cl.
CPC ........... *B01D 61/445* (2013.01); *B01D 61/46* (2013.01); *B01D 69/02* (2013.01); *B01D 69/1071* (2022.08); *B01D 69/1213* (2022.08); *B01D 69/125* (2013.01); *B01D 71/26* (2013.01); *B01D 71/261* (2022.08); *B01D 71/262* (2022.08); *B01D 71/281* (2022.08); *B01D 71/301* (2022.08); *B01J 39/04* (2013.01); *B01J 39/20* (2013.01); *B01J 41/04* (2013.01); *B01J 41/14* (2013.01); *B01J 47/12* (2013.01); *C08J 5/22* (2013.01); *C08J 5/2275* (2013.01); *C25B 13/02* (2013.01); *C25B 13/08* (2013.01); *B01D 2325/42* (2013.01); *C08J 2325/14* (2013.01); *C08J 2325/18* (2013.01);

*C08J 2353/02* (2013.01); *C08J 2423/06* (2013.01); *C08J 2423/12* (2013.01); *C08J 2427/06* (2013.01)

(58) Field of Classification Search
CPC .............. B01D 61/445; B01D 69/1213; B01D 69/125; B01D 71/301
USPC .......................................................... 521/27
See application file for complete search history.

(56) References Cited

U.S. PATENT DOCUMENTS

| | | | |
|---|---|---|---|
| 3,562,139 A * | 2/1971 | Leitz ...................... | C08J 5/2275 204/538 |
| 3,925,174 A | 12/1975 | Eng et al. | |
| 4,116,889 A | 9/1978 | Chlanda et al. | |
| 4,766,161 A | 8/1988 | Chlanda et al. | |
| 5,049,250 A | 9/1991 | Chlanda | |
| 8,980,070 B2 | 3/2015 | Nishio et al. | |
| 2011/0240463 A1 | 10/2011 | Nishio et al. | |
| 2017/0098846 A1 | 4/2017 | Watakabe et al. | |

FOREIGN PATENT DOCUMENTS

| | | |
|---|---|---|
| CN | 104861194 A | 8/2015 |
| EP | 0143582 A2 | 6/1985 |
| JP | 51-93791 A | 8/1976 |
| JP | 53-37190 A | 4/1978 |
| JP | 54-94485 A | 7/1979 |
| JP | 4-228591 A | 8/1992 |
| JP | 2003-12835 A | 1/2003 |
| JP | 2010-132829 A | 6/2010 |
| WO | WO 2010/067775 A1 | 6/2010 |

OTHER PUBLICATIONS

Chakrabarty et al., "In situ ion substitution of sodium gluconate: Comparison of bipolar membrane electrodialysis and electro-membrane reactor for producing gluconic acid", Journal of Membrane Science and Research, vol. 1, 2015, pp. 16-25.
Chinese Office Action and Search Report for Chinese Application No. 201780022924.3, dated Aug. 27, 2020, with English translation of the Office Action.

(Continued)

*Primary Examiner* — Fred M Teskin

(74) *Attorney, Agent, or Firm* — Birch, Stewart, Kolasch & Birch, LLP

(57) ABSTRACT

A bipolar membrane in which a cation-exchange membrane and an anion-exchange membrane are joined to each other, wherein a leakage ratio of gluconic acid at 60° C. is not more than 1.0%, and the cation-exchange membrane is supported by a polyolefin reinforcing member and, further, contains a polyvinyl chloride.

6 Claims, No Drawings

(56) References Cited

OTHER PUBLICATIONS

Extended European Search Report, dated Nov. 20, 2019, for corresponding European Application No. 17782485.1.
International Search Report for PCT/JP2017/015180 (PCT/ISA/210) mailed on Jun. 27, 2017.
Khodabakhshi ("Comparative Studies on Morphological, Electrochemical, and Mechanical Properties of S-Polyvinyl Chloride Based Heterogeneous Cation-Exchange Membranes with Different Resin Ratio Loading", I&EC Research, 2010, 49, pp. 8477-8487), (Year: 2010).
Korean Office Action dated Dec. 2, 2020 for corresponding Application No. 10-2018-7028009 with an English translation.
Trivedi et al ("Studies on bipolar membranes", Reactive & Functional Polymers, 28, 1996, pp. 243-251) (Year: 1996).
Written Opinion of the International Searching Authority, dated Jun. 27, 2017, issued in PCT/JP2017/015180 (Form PCT/ISA/237).

* cited by examiner

BIPOLAR MEMBRANE

This application is a Divisional of copending application Ser. No. 16/091,918 filed on Oct. 5, 2018, which is the U.S. National Phase of PCT/JP2017/015180, filed Japan on Apr. 13, 2017, and which claims priority under 35 U.S.C. § 119(a) to Application No. 2016-081450 filed in Japan, on Apr. 14, 2016, the entire contents of all of which are expressly incorporated by reference into the present application.

TECHNICAL FIELD

This invention relates to a bipolar membrane obtained by sticking a cation-exchange membrane and an anion-exchange membrane together, and to a method of producing the same. More specifically, the invention relates to a bipolar membrane having improved adhesiveness between the cation-exchange membrane and the anion-exchange membrane, and having an improved current efficiency, and to a method of producing the same.

BACKGROUND ART

The bipolar membrane is a composite membrane obtained by sticking a cation-exchange membrane and an anion-exchange membrane together, and has a function of dissociating water into protons and hydroxide ions. To utilize this special function, the bipolar membrane is set in an electrodialyzer together with a cation-exchange membrane and/or an anion-exchange membrane, and the electrodialysis is executed to produce an acid and an alkali from a neutral salt.

The above bipolar membrane requires a high degree of adhesiveness, specifically, between the cation-exchange membrane and the anion-exchange membrane. When put to use, for example, for the electrodialysis for extended periods of time or under high-temperature conditions, it is desired that the electrodialisys can be executed while effectively preventing the membranes from swelling, without permitting the membranes to be peeled off and maintaining stability.

As the bipolar membrane that satisfies the above requirements, for example, a patent document 1 discloses a bipolar membrane whose at least either the cation-exchange membrane or the anion-exchange membrane contains a chlorinated polyolefin. The above bipolar membrane has a high adhesiveness between the cation-exchange membrane and the anion-exchange membrane, and features excellent stability at the time of electrodialysis. From the standpoint of current efficiency, however, there still remains a room for improvement.

PRIOR ART DOCUMENT

Patent Document

Patent document 1: JP-A-2010-132829

OUTLINE OF THE INVENTION

Problems that the Invention is to Solve

It is, therefore, an object of the present invention to provide a bipolar membrane in which a cation-exchange membrane and an anion-exchange membrane are firmly adhered together, and exhibiting an excellent current efficiency even under high-temperature conditions, and a method of producing the same.

Means for Solving the Problems

According to the present invention, there is provided a bipolar membrane in which a cation-exchange membrane and an anion-exchange membrane are joined to each other, wherein a leakage ratio of gluconic acid at 60° C. is not more than 1.0%, and the cation-exchange membrane is supported by a polyolefin reinforcing member and, further, contains a polyvinyl chloride.

In the bipolar membrane of the present invention, it is desired that:

(1) An area ratio of a portion where the cation-exchange membrane and the anion-exchange membrane are peeled off is not more than 20% after the bipolar membrane is dipped in a 6N sodium hydroxide aqueous solution of 25° C. for one hour and then in pure water of 25° C. for another one hour; and (2) The cation-exchange membrane contains the polyvinyl chloride in an amount of 10 to 45% by mass.

According to the present invention, further, there is also provided a method of producing a bipolar membrane including a step of forming a cation-exchange membrane, and a step of forming an anion-exchange membrane on the surface of the cation-exchange membrane; wherein the step of forming the cation-exchange membrane includes:

a step of impregnating a polyolefin reinforcing member with a polymerizable composition obtained by mixing a polyvinyl chloride (A) and a polymerization-curable component(B) that contains a monomer (b1) having a cation-exchange group or a monomer (b2) having a reaction group capable of introducing a cation-exchange group; and a step of forming a membrane of a cation-exchange resin that contains the polyvinyl chloride or of a cation-exchange resin precursor resin by polymerization-curing the polymerizable composition at a temperature of not lower than 100° C.; and, further, as required, a step of introducing a cation-exchange group into the cation-exchange resin precursor resin.

In the method of producing the bipolar membrane of the present invention, it is desired that:

(1) The method of production includes a step of impregnating a polyolefin reinforcing member with the polymerizable composition obtained by mixing the polyvinyl chloride (A) and a monomer (b1) having a cation-exchange group, and the step of forming a membrane of the cation-exchange resin that contains the polyvinyl chloride by the polymerization curing at a temperature of not lower than 100° C.; and (2) The method of production includes a step of impregnating a polyolefin reinforcing member with the polymerizable composition obtained by mixing the polyvinyl chloride (A) and the monomer (b2) having a reaction group capable of introducing a cation-exchange group, a step of forming a membrane of the cation-exchange resin precursor resin by the polymerization curing at a temperature of not lower than 100° C., and a step of introducing a cation-exchange group by acting a cation-exchange group introducing agent upon the cation-exchange resin precursor resin.

In the production method of the invention, further, it is desired that:

(3) The step of forming the anion-exchange membrane on the surface of the cation-exchange membrane, further, includes a step of applying a polar organic solvent solution of the anion-exchange resin on the surface of the cation-exchange membrane, and a step of removing the polar organic solvent;

(4) The step of forming the anion-exchange membrane on the surface of the cation-exchange membrane, further, includes a step of applying, on the surface of the cation-exchange membrane, a polar organic solvent solution of an anion-exchange resin precursor resin having a reaction group capable of introducing the anion-exchange group, a step of forming a membrane of the anion-exchange resin precursor resin on the surface of the cation-exchange membrane by removing the polar organic solvent, and a step of introducing the anion-exchange group into the anion-exchange resin precursor resin; or (5) The step of forming the anion-exchange membrane on the surface of the cation-exchange membrane, further, includes a step of applying, on the surface of the cation-exchange membrane, a polar organic solvent solution that contains an anion-exchange resin precursor resin having a reaction group capable of introducing the anion-exchange group and an anion-exchange group introducing agent, and a step of removing the polar organic solvent.

Effects of the Invention

The present invention is concerned to a bipolar membrane which uses a cation-exchange membrane as the exchange base membrane (hereinafter also referred to as "cation-exchange base membrane"). A solution for forming an anion-exchange resin is applied onto the surface of the cation-exchange base membrane, and the solvent is removed from the layer that is applied in order to form an anion-exchange membrane. The cation-exchange base membrane is the one that is obtained by impregnating a polyolefin reinforcing member with a polymerizable composition that contains a polymerization-curable component for forming a cation-exchange resin and a polyvinyl chloride, followed by curing by polymerization. In the invention, an important feature resides in that the cation-exchange base membrane contains the polyvinyl chloride. This makes it possible to attain both a strong adhesion between the anion-exchange membrane and the cation-exchange membrane and an excellent electric current efficiency under a high temperature condition (60° C.). The reasons for this will now be described in detail.

The polyvinyl chloride works as a resin for adhering the cation-exchange base membrane and the anion-exchange membrane together. Namely, the polyvinyl chloride exhibits a high degree of affinity to the polymerization-curable component (B) (e.g., styrene, divinylbenzene, etc.) that is used for forming the cation-exchange base membrane, to the cation-exchange resin (e.g., a resin having a specific skeleton that will be described later) or to the precursor resin thereof (e.g., a precursor resin having a specific skeleton that will be described later) and, besides, is highly compatible with various polar organic solvents. It will, therefore, be understood that the polyvinyl chloride has its high molecular chain (specifically, amorphous portion) entangled with a high molecular chain of the cation-exchange resin in the cation-exchange base membrane, and forms a structure that cannot be easily separated from the cation-exchange membrane. Besides, in forming the anion-exchange membrane, the polyvinyl chloride present in the cation-exchange base membrane migrates partly into the solvent that forms the anion-exchange resin due to the polar solvent contained in the solvent for forming the anion-exchange resin. Therefore, the polyvinyl chloride is made present in the interface between the cation-exchange base membrane and the anion-exchange membrane in a form being engaged with both membranes. As a result, the polyvinyl chloride exhibits a high degree of anchoring effect, and the adhesiveness is markedly improved between the two membranes. Here, if the polyvinyl chloride is added to the anion-exchange membrane, then the polyvinyl chloride does not migrate insufficiently into the cation-exchange base membrane that has been polymerized and cured, and a strong adhesiveness is not obtained.

Attempts had so far been made even with the conventional bipolar membranes to improve the adhesiveness based on the above-mentioned principle. Referring, for instance, to the bipolar membrane of the patent document 1 obtained by containing the chlorinated polyolefin in the cation-exchange base membrane, adhesiveness had also been improved between the anion-exchange membrane and the cation-exchange membrane relying on the anchoring effect produced by the chlorinated polyolefin. However the bipolar membrane of the patent document 1 was not capable of improving the electric current efficiency.

Through the study of the conventional bipolar membranes, the present inventors have discovered that with the cation-exchange base membrane provided with a reinforcing member such as polyolefin woven fabric, the junction was poor between the reinforcing member and the cation-exchange resin, and gaps developed in the interface between the reinforcing member and the cation-exchange resin permitting, therefore, the anions such as hydroxide ions to pass through the gaps and through the cation-exchange membrane during the electrodialysis. Such unwanted motion of anions means that an electric current flows without contributing to the hydrolysis reaction at the time of electrodialysis and, therefore, forming the acid and alkali in relatively decreased amounts despite of the amount of electricity that is used causing, therefore, a decrease in the electric current efficiency.

In order not to form the gap in the interface between the reinforcing member and the cation-exchange resin, it can be contrived to form a cation-exchange base membrane based on the polymerization and curing under a condition of a temperature which is so high that the reinforcing member partly melts so that the reinforcing member and the cation-exchange resin are reliably melt-adhered together. However, if this method is applied to the bipolar membrane of the patent document 1, then the chlorinated polyolefin and the cation-exchange resin undergo the separation in phase in the cation-exchange base membrane, causing the chlorinated polyolefin to agglomerate or, in other words, causing the chlorinated polyolefin to be no longer dispersed homogeneously. As a result, the chlorinated polyolefin is present in decreased amounts in the interface between the anion-exchange membrane and the cation-exchange membrane, the adhesiveness is lost, and the strength of the membrane decreases.

In this regard, the present invention does not use the chlorinated polyolefin but, instead, uses the polyvinyl chloride. Even when the cation-exchange resin is formed by the polymerization under such a high temperature condition that the polyolefin reinforcing member partly melts, the polyvinyl chloride does not undergo the phase separation and disperses homogeneously in the cation-exchange resin. This is because the polyvinyl chloride exhibits very higher affinity to the monomer component used for forming the cation-exchange base membrane and to the cation-exchange resin in the membrane and very higher compatibility to various polar solvents than those exhibited by the chlorinated polyolefin. This accounts for close adhesion between the polyolefin reinforcing member and the cation-exchange resin without forming gaps and for the presence of the polyvinyl chloride in sufficient amounts in the interface between the anion-exchange membrane and the cation-exchange membrane. As a result, the present invention realizes both strong adhesion between the anion-exchange membrane and the cation-exchange membrane and excellent electric current efficiency. As for the electric current efficiency, specifically, the Examples appearing later are demonstrating that when the electrodialysis is executed under a high temperature condition (60° C.), the leakage ratio of gluconic acid is suppressed to be not more than 1.0%, proving that anions such as gluconic acid ions are effectively suppressed from passing through the cation-exchange membrane.

MODES FOR CARRYING OUT THE INVENTION

As described earlier, the bipolar membrane of the present invention uses a cation-exchange membrane as the exchange base membrane, and has the anion-exchange membrane formed on one surface of the cation-exchange base membrane. The cation-exchange base membrane is supported by the polyolefin reinforcing member and contains the polyvinyl chloride.

<Polyvinyl Chloride (A)>

As the polyvinyl chloride (A), there can be used any known ones without limitation. For instance, there can be used not only a homopolymer of vinyl chloride monomer but also copolymers copolymerized with other monomers so far as they do not impair the properties of the polyvinyl chloride or the object of the invention. As other monomers that are copolymerizable, there can be exemplified α-olefins such as ethylene, propylene, etc. and vinyl esters such as vinyl acetate, etc. These polyvinyl chlorides may be used alone or in a combination of two or more kinds, as a matter of course.

The chlorine content of the polyvinyl chloride (A) is in a range of, desirably, 30 to 80% by mass and, specifically, 55 to 70% by mass. The polyvinyl chloride (A) having a chlorine content in this range has a high degree of affinity to the polar solvent, and works advantageously in the mechanism of adhesion.

From the standpoint of heat resistance, furthermore, it is desired that the polyvinyl chloride has a high softening point, e.g., has a Crash Berg flexible temperature (JIS K6734) of not lower than 60° C. and, more preferably, not lower than 65° C. The polyvinyl chloride that lies within the above range is capable of holding a high degree of adhesiveness even under high temperature conditions. Besides, the polyvinyl chloride has a low bipolar voltage, and does not cause the membrane to peel off even during the electrodialysis under high temperature conditions enabling, therefore, the electrodialysis to be executed maintaining stability. The polyvinyl chlorides, in general, have Crash Berg flexible temperatures of not higher than 70° C.

Though not specifically limited, the polyvinyl chloride (A) has an average polymerization degree which usually lies in a range of 500 to 3,000 and, specifically, 800 to 2,000. The longer the molecular chain of the polyvinyl chloride, the larger the degree of entanglement with the molecules of the cation-exchange resin and the higher the degree of adhesiveness. However, too long molecular chains cause a decrease in the solubility thereof in a solvent, and migration into the anion-exchange resin decreases. As a result, the entanglement becomes loose in the interface between the two membranes, and the adhesiveness decreases between the two membranes. If the average polymerization degree lies within the above-mentioned range, an improved adhesiveness is achieved and, therefore, a bipolar membrane is obtained having a low bipolar voltage.

The polyvinyl chloride (A) can be put to use in a known form such as powder, pellets or the like. Among them, however, the powdery form is preferred and, more preferably, the powdery form having an average particle size of 0.1 to 30 μm as measured by the laser diffraction light scattering method. The powdery polyvinyl chloride has good affinity to the cation-exchange resin (e.g., resin having a specific skeleton that will be described later) or to a precursor resin thereof (e.g., precursor resin having a specific skeleton that will be described later), and can be homogeneously dispersed. The powdery polyvinyl chloride can be obtained by a known suspension polymerization method.

In the present invention, the polyvinyl chloride (A) may be contained in the cation-exchange base membrane. This is because, as described above, the cation-exchange base membrane that is blended with the polyvinyl chloride exhibits the effect for improving adhesiveness more than the anion-exchange membrane. It is allowable, of course, for the anion-exchange membrane to contain the polyvinyl chloride in a range in which it does not impair the properties of the bipolar membrane of the present invention.

Further, the polyvinyl chloride (A) is polymerized in a state of being made compatible with the monomer (b1) having a cation-exchange group, with the monomer (b2) having a reaction group capable of introducing the cation-exchange group, or with a crosslinking monomer. The polyvinyl chloride (A), therefore, is present in a state of being entangled with the molecular chain of the cation-exchange resin. As a result, the polyvinyl chloride (A) is effectively prevented from separating, and a particularly improved adhesiveness is obtained. It is, therefore, desired that the polyvinyl chloride (A) is contained in the cation-exchange membrane that contains the cation-exchange resin that is obtained, specifically, by sulfonating a styrene-divinylbenzene copolymer. This is because the styrene-divinylbenzene copolymer is obtained by the polymerization of a monomer such as styrene having a very high degree of affinity to the polyvinyl chloride or by the polymerization of a crosslinking component such as divinylbenzene.

The polyvinyl chloride (A) is contained in the cation-exchange base membrane in an amount of, preferably, 10 to 45% by mass, more preferably, 15 to 35% by mass and, particularly preferably, 20 to 30% by mass (on the dry weight basis). If the amount of the polyvinyl chloride is too small, the effect is not sufficient for improving the adhesiveness between the cation-exchange base membrane and the anion-exchange membrane. If the amount thereof is too large, on the other hand, the resistance of the membrane so increases as to cause such an inconvenience as a rise in the bipolar voltage.

<Production of the Cation-Exchange Base Membrane>

The invention can use a cation-exchange membrane known per se. as the cation-exchange base membrane. In the invention, the cation-exchange base membrane has a polyolefin reinforcing member which imparts strength and heat resistance to the bipolar membrane.

As the polyolefin, there can be exemplified homopolymers of α-olefins, such as ethylene, propylene, 1-butene and 4-methyl-1-pentene, or random or block copolymers thereof. Concretely, there can be exemplified low-density polyethylene, high-density polyethylene, polypropylene, poly (1-butene) and poly (4-methyl-1-pentene). Among them, low-density polyethylene, high-density polyethylene and polypropylene are preferred. Further, from the standpoint of easy availability and affinity to the cation-exchange resin, the polyethylene type polymers are most desirably used, such as low-density polyethylene and high-density polyethylene.

The polyolefin reinforcing member may assume any form such as woven fabric, nonwoven fabric or porous film but, preferably assumes the form of the woven fabric from the standpoint of strength. The filament of the woven fabric may be in the form of either a multi-filament or a mono-filament. The mono-filament, however, is preferred from the standpoint of strength. Moreover, though it may be suitably selected depending on the use, the polyolefin woven fabric has a thickness which is, usually, 50 to 500 μm and, preferably, 100 to 300 μm, and the filament has a thickness of, specifically, 10 to 250 deniers (20 to 200 μm) from the standpoint of taking a balance between the strength and the membrane resistance.

As the cation-exchange resin for forming the cation-exchange membrane, there can be used any one that has been known per se. For example, there can be used a resin having a specific skeleton or a precursor resin that forms the specific skeleton and in which a cation-exchange group has been introduced. As the precursor resin for forming the specific skeleton, there can be exemplified polymers obtained by polymerizing a monomer having an ethylenically unsaturated double bond such as of vinyl type, styrene type or acryl type, and copolymers thereof; and hydrocarbon type resins having an aromatic ring on the main chain thereof, such as polysulfone, polyphenylene sulfide, polyether ketone, polyether ether ketone, polyether imide, polyphenylene oxide, polyether sulfone, and polybenzimidazole.

There is no particular limitation on the cation-exchange group if it is a reaction group that is capable of turning into a negative charge in an aqueous solution. There can be exemplified sulfonic acid group, carboxylic acid group and phosphonic acid group. Usually, there is preferably used the sulfonic acid group that is a strong acid group.

The cation-exchange base membrane may be produced according to a method known per se. Representative methods include a method of impregnating the polyolefin reinforcing member with a polymerizable composition which contains the polyvinyl chloride (A) and the polymerization-curable component (B) that contains the monomer (b1) having a cation-exchange group, and forming a membrane of the cation-exchange resin by polymerizing and curing the polymerizable composition (hereinafter often called "method I"), and a method of impregnating the polyolefin reinforcing member with a polymerizable composition which contains the polyvinyl chloride (A) and the polymerization-curable component (B) that contains the monomer (b2) having a reaction group capable of introducing a cation-exchange group, forming a membrane of the cation-exchange resin precursor resin by polymerizing and curing the polymerizable composition, and introducing a cation-exchange group into the cation-exchange resin precursor resin (hereinafter often called "method II").

The method I will be described, first. This method is capable of forming a membrane of the cation-exchange resin which is the same as the resin obtained by introducing a cation-exchange group into the precursor resin that has the specific skeleton by simply polymerizing and curing the polymerizable composition without requiring the step of separately introducing the cation-exchange group. Concretely, the polymerizable composition is prepared by mixing together the polyvinyl chloride (A) and the polymerization-curable components (B) for forming the cation-exchange resin, such as the monomer (b1) having a cation-exchange group, a crosslinking monomer and a polymerization initiator. The polymerizable composition is filled in the gaps in the polyolefin reinforcing member which is in the form of a woven fabric and is, thereafter, polymerized and cured to form the cation-exchange resin. There is thus obtained the desired cation-exchange base membrane.

The polymerization-curing temperature is nearly so set that the polyolefin reinforcing member melts. Though dependent upon the kinds and the polymerization-curing times of the olefin and the polymerization-curable component (B), the lower limit of the polymerization-curing temperature is, usually, a melting point minus 40° C. and, preferably, a melting point minus 20° C. of the polyolefin that constitutes the reinforcing member, whereas the upper limit of the polymerization-curing temperature is a melting point plus 20° C. and, preferably, a melting point plus 5° C. thereof. Concretely, the lower limit of the polymerization-curing temperature is 100° C. and, preferably, 110° C. whereas the upper limit thereof is, preferably, 160° C. If the polymerization is executed at an excessively low temperature, then gaps are made present in the interface between the polyolefin reinforcing member and the cation-exchange resin, and the current efficiency may decrease. If the temperature is too high, on the other hand, the polyolefin reinforcing member may once melt completely, and the strength of the obtained cation-exchange base membrane may decrease strikingly.

The monomer (b1) having the cation-exchange group contained in the polymerization-curable component (B) may be the one that has heretofore been used for producing the cation-exchange resin. For example, there can be used sulfonic acid type monomers, such as α-halogenated vinyl sulfonate, styrene sulfonate and vinyl sulfonate; carboxylic acid type monomers, such as methacrylic acid, acrylic acid and maleic anhydride; phosphonic acid type monomers, such as vinyl phosphonate and the like; and salts and esters of the above monomers.

The crosslinking monomer is used for densifying the cation-exchange resin, for suppressing the swelling and for increasing the membrane strength, and no specific limitation is imposed thereon. There can be used, for example, divinylbenzene, divinylsulfone, butadiene, chloroprene, divinylbiphenyl, trivinylbenzenes, divinylnaphthalene, diallylamine and divinylpyridine. The crosslinking monomer is used in an amount of, preferably, 0.1 to 50 parts by mass and, more preferably, 1 to 40 parts by mass per 100 parts by mass of the monomer (b1) that has the cation-exchange group.

In addition to the above-mentioned monomer (b1) having the cation-exchange group and the crosslinking monomer, there may be added, as required, other monomers capable of copolymerizing with the above monomers. As the other monomers, there can be used styrene, chloromethylstyrene, acrylonitrile, methylstyrene, ethylvinylbenzene, acrolein, methyl vinyl ketone and vinylbiphenyl. The amounts of the other monomers may differ depending on the object of addition. Usually, however, the other monomers are added in a total amount of 0 to 100 parts by mass per 100 parts by mass of the monomer (b1) that has the cation-exchange group. When the flexibility is to be imparted, in particular, the other monomers are added in amounts of 1 to 80 parts by mass and, specifically, 5 to 70 parts by mass.

As the polymerization initiator, there can be used those known per se. without any limitation. Concretely, there are used organic peroxides such as octanoyl peroxide, lauroyl peroxide, t-butylperoxy-2-ethyl hexanoate, benzoyl peroxide, t-butylperoxyisobutylate, t-butylperoxylaurate, t-hexylperoxybenzoate, di-t-butylperoxide and 1,3,3-tetramethyl-butylhydroperoxide. The polymerization initiator is used in an amount of, preferably, 0.1 to 20 parts by mass and, more preferably, 0.5 to 10 parts by mass per 100 parts by mass of the monomer (b1) that has the cation-exchange group.

The polymerizable composition is prepared by blending the above polymerization-curable component (B) with the polyvinyl chloride (A) so that the cation-exchange membrane that is finally obtained will possess the above-mentioned composition. There is no particular limitation on the method of adding the polyvinyl chloride. The polyvinyl chloride may be stirred together with the polymerization-curable component (B) at room temperature such that a homogeneously mixed polymerizable composition is obtained. Or the polyvinyl chloride may be stirred and mixed together with the polymerization-curable component (B) at a temperature at which the polymerization-curable component (B) does not undergo the polymerization or, concretely, at a temperature of not higher than 50° C.

The polymerizable composition may, as required, contain a chlorinated polyolefin, a thickener and known additives.

As the chlorinated polyolefin, there can be exemplified a chlorinated polyolefin that is closely described in, for example, the patent document 1. Though dependent upon the kinds of the cation-exchange base membrane and the anion-exchange membrane, addition of the chlorinated polyolefin further increases the adhesiveness. The amount of addition thereof is 0 to 10 parts by mass per 100 parts by mass of the polyvinyl chloride (A).

As the thickener, there can be used saturated aliphatic hydrocarbon type polymers such as ethylene-propylene copolymer and polybutylene; styrene type polymers such as styrene-butadiene copolymer and the like; and polyolefin powder having an average particle size of not more than 10 μm. By using the thickener, the viscosity can be so adjusted as to effectively prevent the dripping during the membrane-forming work.

Further, as the additives, there can be used plasticizers such as dioctyl phthalate, dibutyl phthalate, tributyl phosphate, styrene oxide, tributyl acetylcitrate, or alcohol esters of fatty acid or aromatic acid; and hydrochloric acid-trapping agents such as ethylene glycol diglycidyl ether and the like.

There is no specific limitation on the method of impregnating the voids in the polyolefin reinforcing member with the polymerizable composition. For instance, the polyolefin reinforcing member is dipped in a vessel filled with the polymerizable composition. Impregnation with the polymerizable composition can also be executed by such a method as spray coating or application by using a doctor blade in addition to the dipping.

The polymerizable composition with which the polyolefin reinforcing member is impregnated as described above is heated in a polymerization apparatus such as heating oven, and is polymerized and cured.

In the step of polymerization, in general, a method is employed in which the polyolefin reinforcing member impregnated with the polymerizable composition is held by a polyester film, and the temperature thereof is elevated starting from the normal temperature under a pressurized condition. The pressure is, usually, about 0.1 to 1.0 MPa, and is produced by using an inert gas such as nitrogen or by using a roll. Due to the application of pressure, the polymerization is carried out in a state where an excess of the polymerizable composition present on the outer interface of the polyolefin reinforcing member is pushed into voids in the polyolefin reinforcing member, effectively preventing the occurrence of resin reservoirs.

Other polymerization conditions vary depending on the kind of the polymerization-curable component (B), and should be suitably selected from the known conditions and determined. The polymerization temperature is set, as described above, to be such that the polyolefin reinforcing member partly melts. Further, the polymerization time is, usually, about 3 to about 20 hours though dependent upon the polymerization temperature and the like. After the completion of the polymerization and curing, there is obtained a cation-exchange membrane, i.e., a cation-exchange base membrane supported by the polyolefin reinforcing member.

Next, the method II will be described. According to this method, the cation-exchange base membrane is formed by using a polymerization-curable component for forming the cation-exchange resin precursor resin instead of using the polymerization-curable component for forming the cation-exchange resin used in the method I. Concretely speaking, the cation-exchange base membrane is prepared by blending the polymerizable composition with the monomer (b2) having a reaction group capable of introducing the cation-exchange group instead of the monomer (b1) having the cation-exchange group. In this case, too, the cation-exchange base membrane may be prepared in the same manner as in the method I that uses the monomer (b1) having the cation-exchange group but necessitating the step of introducing the cation-exchange group that will be described later.

The monomer (b2) having the reaction group capable of introducing the cation-exchange group may be the one that has heretofore been used for producing the cation-exchange resin. Examples thereof include styrene, vinyltoluene, vinylxylene, ethylvinylbenzene, α-methylstyrene, vinylnaphthalene and α-halogenated styrene.

In addition to the monomer (b2) having the reaction group capable of introducing the cation-exchange group and the crosslinking monomer, it is also allowable to use any other monomers. As the other monomers, there can be used chloromethylstyrene, acrylonitrile, acrolein and methyl vinyl ketone.

The step of introducing the cation-exchange group is carried out after the membrane of the cation-exchange resin precursor resin is formed by polymerizing and curing the polymerizable composition. In this step, the concentrated sulfuric acid, chlorosulfonic acid or phosphoric acid is acted, as the cation-exchange group introducing agent, upon the precursor resin that is obtained so as to be sulfonated, chlorosulfonated or phosphoniated, or the precursor resin that is obtained is hydrolyzed to introduce the cation-exchange group into it. There is thus obtained the desired cation-exchange base membrane.

In the present invention, it is desired to employ the method II that uses the monomer (b2) having the reaction group capable of introducing the cation-exchange group. This is because in the present invention, an important feature resides in the formation of the cation-exchange base membrane from the polymerizable composition that comprises the polymerization-curable component (B) and the polyvinyl chloride (A). Here, however, the polyvinyl chloride (A) dissolves more in the monomer to which no cation group has been introduced than in the monomer (b1) that has the cation-exchange group.

In the invention, further, it is also possible to fill the gaps of the polyolefin reinforcing member with a solution of a cation exchange group-containing high molecular compound obtained by dissolving a cation exchange group-containing high molecular compound in a solvent instead of relying on the method that uses the polymerizable composition for forming the above-mentioned cation-exchange resin or the cation-exchange resin precursor resin. However, the method that uses the polymerizable composition is preferred since the polymerization and curing are executed at a temperature near the melting point of the polyolefin reinforcing member contributing to improving the adhesiveness between the reinforcing member and the cation-exchange resin.

It is desired that the cation-exchange base membrane prepared as described above has a thickness in a range of 10 to 500 µm and, more preferably, 100 to 300 µm. If the thickness is too small, the strength of the exchange base membrane may greatly decrease. If the thickness is too large, inconvenience may occur such as an increase in the bipolar voltage.

The cation-exchange base membrane has a burst strength of, usually, 0.1 to 3.0 MPa though dependent upon the thickness thereof. Desirably, the thickness of the polyolefin reinforcing member and the amount of the crosslinking monomer in the whole monomers are so set that the burst strength of the cation-exchange base membrane is 0.2 to 1.8 MPa.

It is desired that the cation-exchange base membrane has an ion-exchange capacity of, usually, in a range of 0.1 to 4 meq/g and, specifically, 0.5 to 2.5 meq/g from the standpoint of bipolar membrane properties, such as voltage drop and current efficiency. The membrane resistance, too, is, desirably, not larger than 10 $\Omega \cdot cm^2$ and, specifically, in a range of 1 to 5 $\Omega \cdot cm^2$.

<Forming the Anion-Exchange Membrane>

Next, an anion-exchange membrane is formed on the surface of the cation-exchange base membrane formed as described above. Though there is no specific limitation on the method of forming the anion-exchange membrane, the following three methods can be preferably employed.

(Precursor Resin Type Two-Step Method)

On the surface of the cation-exchange membrane, there is applied a polar organic solvent solution of the anion-exchange resin precursor resin having the reaction group capable of introducing the anion-exchange group. The polar organic solvent is then removed to form a membrane of the anion-exchange resin precursor resin on the surface of the cation-exchange membrane. Next, the anion-exchange group is introduced into the anion-exchange resin precursor resin to thereby form the anion-exchange membrane on the cation-exchange base membrane.

(Non-Precursor Resin Type One-Step Method)

A polar organic solvent solution of the anion-exchange resin is applied onto the surface of the cation-exchange membrane. The polar organic solvent is then removed, and an anion-exchange membrane is formed through one step.

(Precursor Resin Type One-Step Method)

A polar organic solvent solution is applied onto the surface of the cation-exchange membrane, the polar organic solvent solution containing the anion-exchange resin precursor resin having the reaction group capable of introducing the anion-exchange group and, further, containing the anion-exchange resin introducing agent. The polar organic solvent is then removed, and an anion-exchange membrane is formed through one step.

If the polyvinyl chloride is to be contained in the anion-exchange membrane, too, then the polyvinyl chloride should be contained in the polar organic solvent solution that is used in the above-mentioned three methods.

In the present invention, prior to forming the anion-exchange membrane on the cation-exchange base membrane, it is desired to subject the surface of the cation-exchange base membrane (surface on the side on where the anion-exchange membrane is to be formed) to the surface-roughening treatment. For instance, the arithmetic mean surface roughness Ra is adjusted to be in a range of 0.1 to 2.0 µm and, specifically, 0.5 to 1.8 µm. Upon forming the anion-exchange membrane on the rough surface, the density of the membrane can be increased and, therefore, the anchoring effect can be increased. As a result, there is obtained a bipolar membrane having improved adhesiveness between the cation-exchange base membrane and the anion-exchange resin. The arithmetic mean surface roughness Ra can be calculated by processing the image on the surface that is photographed by using an ultradeep profile microscope.

The surface can be roughened by a known method. For example, the surface (to be joined) of the cation-exchange base membrane is directly rubbed with a sand-paper, or a hard granular material such as sand is blown thereto. Or, the cation-exchange base membrane may be formed by impregnating the polyolefin reinforcing member with the polymerizable composition as described above followed by the polymerization and curing. In this case, at the time of producing the cation-exchange membrane, the polymerizable composition is polymerized and cured by being held by a rough surface-forming film such as of a polyethylene terephthalate that is forming rough surface as described above. Thereafter, the film is removed to thereby form the rough surface.

As the organic solvent for forming the polar organic solvent solution used in the above-mentioned three methods, there can be used the one that does not affect the properties of the cation-exchange base membrane forming the lower layer but that accelerates the polyvinyl chloride (A) in the cation-exchange base membrane to be partly migrated into the anion-exchange membrane. Concretely, there can be used alcohol, ethylene chloride, tetrahydrofuran, dimethylformamide and N-methylpyrrolidone. Among them, the tetrahydrofurane or the dimethylforamide is particularly preferred from the standpoint of accelerating the migration of the polyvinyl chloride.

In the non-precursor resin type one-step method among the above-mentioned three methods of forming the anion-exchange membrane, the anion-exchange resin is the known one, e.g., is a resin having a specific skeleton or a resin obtained by introducing the anion-exchange group into a precursor resin that has a specific skeleton. As the precursor resin having the specific skeleton, there can be exemplified the same resins as those of the case of the cation-exchange resin. There is no specific limitation on the anion-exchange group if it is a reaction group capable of serving as a positive electric charge in an aqueous solution. Examples thereof include primary to tertiary amino groups, quaternary ammonium salt group, pyridyl group, imidazole group and quaternary pyridinium salt group. Usually, the quaternary ammonium salt group and the quaternary pyridinium salt group which are strongly basic groups are preferred.

In the precursor resin type two-step method and the precursor resin type one-step method among the above-mentioned three methods of forming the anion-exchange membrane, as the anion-exchange resin precursor resin, there can be used a high molecular compound having a monomer unit capable of introducing an anion-exchange group, such as chloromethylstyrene, vinylpyridine and vinylimidazole; and high molecular compounds into which has been introduced a reaction group capable of introducing an anion-exchange group such as chloromethyl group or bromobutyl group into a styrene type elastomer, like poly-styrene-poly (ethylene-butylene)-polystyrene triblock copolymer, polystyrene-poly (ethylene-propylene)-polystyrene triblock copolymer, polystyrene-polyisoprene block copolymer, and hydrogenated products thereof.

The concentration of the precursor resin in the solution may be suitably set by taking the coating property into consideration. Though there is no limitation, the concentration thereof is, usually, 5 to 40% by mass.

As required, furthermore, the polar organic solvent solution that contains the above-mentioned precursor resin can be blended with a high molecular compound to adjust the properties of the anion-exchange membrane. Specifically, there can be used a high molecular compound to which no anion-exchange group has been introduced in order to adjust the anion-exchange capacity and water content of the anion-exchange membrane, to increase the water-proof property of the exchange membrane and to suppress the swelling thereof. As the high molecular compound, there can be exemplified polystyrene, polystyrene-poly(ethylene-buty-lene)-polystyrene triblock copolymer, polystyrene-poly(eth-ylene-propylene)-polystyrene triblock copolymer, polysty-rene-polyisoprene block copolymer and styrene type elastomers such as hydrogenated products thereof.

Described below are concrete examples of the anion-exchange group introducing agent.
Aminating Agents:
Tertiary amines such as trimethylamine and trimethylam-ine; and diamine compounds such as N,N,N',N'-tetramethyl-1,6-hexanediamine, N,N,N',N'-tetramethyl-1,3-propanedi-amine, and N,N,N',N'-tetramethyl-1,2-ethanediamine.
Alkylating Agents:
Halogenated alkanes such as methyl iodide, ethyl iodide and methyl bromide; and dibromoalkanes such as dibro-mobutane and dibromohexane.

In the case of the precursor resin type two-step method, the polar organic solvent solution containing the anion-exchange resin precursor resin is applied onto the surface of the cation-exchange membrane followed, as required, by drying. Thereafter, the anion-exchange groups are intro-duced therein. The anion-exchange groups can be intro-duced by acting the anion-exchange group introducing agent on the anion-exchange resin precursor resin.

In the invention, the anion-exchange membrane is formed, more preferably, by the non-precursor resin type one-step method. This is because the process of production can be shortened and the cost of production can be lowered. That is, when the anion-exchange membrane is formed by the non-precursor resin type one-step method, no step is required for introducing the anion-exchange groups. There-fore, the productivity can be increased as compared to the case where the two steps are required for forming the anion-exchange resin precursor resin and for introducing the anion-exchange groups.

As the method of forming the anion-exchange membrane, the precursor resin type one-step method, too, is preferred. The precursor resin type one-step method comprises preparing a polar organic solvent solution that contains the anion-exchange resin precursor resin and the anion-ex-change group introducing agent, and applying the polar organic solvent solution followed by drying. Here, introduc-tion of the anion-exchange groups into the anion-exchange resin precursor resin takes place during the period of from when the solution is prepared till when it is dried. Since the anion-exchange groups are introduced while the anion-exchange membrane is being formed as described above, there is easily formed the anion-exchange membrane into which the anion-exchange groups have been introduced homogeneously.

In forming the anion-exchange membrane in the inven-tion, a crosslinked structure can be introduced into the anion-exchange membrane. Concretely speaking, it is desired to use a diamine compound such as N,N,N',N'-tetramethyl-1,6-hexanediamine or to use the dibromoalkane such as dibromobutane or dibromohexane, which is effective in improving water-proof property of the anion-exchange membrane and in suppressing the swelling thereof. Specifi-cally preferably, however, the diamine compound such as N,N,N',N'-tetramethyl-1,6-hexanediamine is used from the viewpoint of easy handling.

The anion-exchange membrane produced as described above has a thickness that lies in a range of, preferably, 1 to 200 μm. Like the cation-exchange base membrane, the anion-exchange membrane has an ion-exchange capacity, usually, in a range of 0.1 to 4 meq/g and, specifically, 0.5 to 2.5 meq/g from the standpoint of bipolar membrane prop-erties. Therefore, the amount of applying the polar organic solvent solution containing the anion-exchange resin or the precursor resin thereof, the composition of the precursor resin (ratio of content of monomer units having the reaction groups) and the amount of the anion-exchange group intro-ducing agent, are so set that the above-mentioned thickness and the anion-exchange capacity can be realized.

In the invention, it is allowable, as required, to suitably employ a known method of lowering the bipolar voltage by introducing ions of a heavy metal (e.g., ions of iron, tin, chromium or ruthenium) having a catalytic action for hydro-lysis, an oxide of the heavy metal or a tertiary amine into the surface of the cation-exchange base membrane (surface on the side where the anion-exchange membrane is to be formed) prior to forming the anion-exchange membrane. From the standpoint of catalytic action, it is desired that the content of the heavy metal in the bipolar membrane is in a range of 1 to 5,000 mg/m² and, preferably, 5 to 1,000 mg/m². Specifically, preferably, there are used tin ions, ruthenium ions or an oxide of tin or ruthenium from the standpoint of not being dissolved in acid or alkali and low toxicity.

After the anion-exchange membrane has been formed, a heat treatment may be suitably executed. This enables the anion-exchange membrane to bite into the rough surface of the cation-exchange base membrane. As a result, adhesive-ness or the strength of junction is greatly improved between the cation-exchange base membrane and the anion-exchange membrane. It is desired that the heat treatment is executed at a temperature higher than, for example, the softening point of the polyolefin reinforcing member in the exchange base membrane. In order to improve the anchoring effect due to the rough surface, furthermore, it is desired that the heat treatment is executed under a pressurized condition while, for example, holding the membranes between the steel plates heated in the above-mentioned temperature range or passing the membranes through the rollers.

<Bipolar Membrane>

In the bipolar membrane of the invention produced as described above, at least the cation-exchange base membrane is blended with the polyvinyl chloride (A). Therefore, the cation-exchange base membrane and the anion-exchange membrane are joined together maintaining a high degree of adhesiveness.

Concretely speaking, as measured in Examples appearing later, even after the bipolar membrane of the invention is dipped in the 6N sodium hydroxide aqueous solution (25° C.) for one hour and, thereafter, in pure water (25° C.) for another one hour, the area ratio a portion where the cation-exchange membrane and the anion-exchange membrane are separated away from each other has been suppressed to be, generally, not more than 20% and, preferably, not more than 10%.

With the bipolar membrane of the invention having such a high degree of adhesiveness, the membranes are not peeled even when put to use in the electrodialysis which, therefore, can be continued for extended periods of time maintaining stability. In the production of acids and alkalis, in particular, the bipolar membrane can be employed under a wide range of production conditions such as of temperatures and the like.

In the invention, furthermore, there is no need of providing any particular adhesive layer between the cation-exchange base membrane and the anion-exchange membrane. Therefore, there is no need, either, of increasing the membrane voltage of the bipolar membrane. As measured in Examples appearing later, therefore, the bipolar voltage is, usually, suppressed to be not higher than 2.0 V and, preferably, not higher than 1.5 V.

In the cation-exchange base membrane of the bipolar membrane of the invention, further, no gap is present between the polyolefin reinforcing member and the cation-exchange resin. Therefore, an improved current efficiency is observed when the bipolar membrane is put to the electrodialysis. This effect is not impaired in the electrodialysis of even under high temperature conditions. In fact, when the gluconic acid is to be produced by the electrodialysis under high temperature conditions by using the bipolar membrane of the present invention, the gluconic acid leakage ratio (60° C.) has been suppressed to be, usually, not more than 1.0% and, preferably, not more than 0.7% as demonstrated in Examples appearing later. On account of the same reasons, furthermore, the hydrolysis efficiency is, usually, not less than 98% as measured in a sodium hydroxide aqueous solution of 60° C. and in a hydrochloric acid aqueous solution.

EXAMPLES

Excellent effects of the invention will now be described by using the following Examples.

In Examples and in Comparative Examples, properties of the bipolar membranes were measured as described below.

1) Bipolar Voltage

There were formed 4-compartment cells of the following constitution by using bipolar membranes (sample bipolar membranes) prepared in Examples and in Comparative Examples and by also using the Neosepta BP-1E (produced by ASTOM Co.) as a control bipolar membrane. Bipolar voltages were measured by using these cells.

Positive electrode (Pt plate) (1.0 mol/L of NaOH)/control bipolar membrane/(1.0 mol/L of NaOH)/sample bipolar membrane/(1.0 mol/L of HCl)/control bipolar membrane/(1.0 mol/L of HCl) negative electrode (Pt plate)

The bipolar voltages were measured under the conditions of a liquid temperature of 25° C. and a current density of 10 A/dm$^2$ via platinum wire electrodes placed holding the bipolar membrane therebetween.

2) Hydrolyzing Efficiency

Platinum electrodes were provided in two compartments of a glass cell having two compartments separated by a bipolar membrane having an effective current-carrying area of 4.5 cm$^2$. An aqueous solution containing 0.8 mol/L of sodium hydroxide was fed in an amount of 60 ml into the positive electrode compartment, and an aqueous solution containing 0.8 mol/L of hydrochloric acid was fed in an amount of 60 ml into the negative electrode compartment. After having flown a direct current of 0.45 A at 60° C. for 20 hours, the quantities of the acid and the base in the two compartments were determined. The current efficiencies for forming the acid and the base were calculated from the quantities of the acid and the base that were formed, and an average value of the two was regarded as a hydrolyzing efficiency of the bipolar membrane.

3) Gluconic Acid Leakage Rate.

Platinum electrodes were provided in two compartments of a glass cell having two compartments separated by a bipolar membrane having an effective current-carrying area of 4.5 cm$^2$. An aqueous solution containing 2.0 mol/L of sodium gluconate was fed in an amount of 50 ml into the positive electrode compartment, and an aqueous solution containing 2.0 mol/L of sodium hydroxide was fed in an amount of 50 ml into the negative electrode compartment. After having flown a direct current of 0.45 A at 60° C. for one hour, the quantity of the gluconic acid in the negative electrode compartment was determined. From the quantity of the gluconic acid that was obtained, the current efficiency of the gluconic acid that has permeated through was calculated and was regarded to be a gluconic acid leakage rate.

4) Adhesiveness of the Bipolar Membrane

The bipolar membrane was dipped in an aqueous solution containing 6.0 mol/L of sodium hydroxide of 25° C. for one hour, taken out therefrom, and was dipped again in pure water of 25° C. for one hour. After taken out from the pure water, the membrane was analyzed by using an image processing system (IP-1000 PC manufactured by Asahi Engineering Co.), and the ratio of an abnormal portion (that was blistered) in 1 cm$^2$ of the membrane was calculated as a peeled area (%).

5) Ion-Exchange Capacity of the Ion-Exchange Membrane

The ion-exchange membrane was dipped in an aqueous solution containing 1 mol/L of HCl for not less than 10 hours.

Thereafter, in the case of the cation-exchange membrane, counter ions of the ion-exchange groups were substituted for the sodium ions from the hydrogen ions by using an aqueous solution containing 1 mol/L of NaCl, and the quantity of free hydrogen ions was determined by the potentiometric titration by using a sodium hydroxide aqueous solution (A mol=A eq). In the case of the anion-exchange membrane, on the other hand, counter ions were substituted for the nitric acid ions from the chloride ions by using an aqueous solution containing 1 mol/L of NaNO$_3$, and the quantity of free chloride ions was determined by the potentiometric titration by using a silver nitrate aqueous solution (A mol=A eq). The potentiometric titration was executed by using a potentiometric titrator (COMT ITE-900 manufactured by Hiranuma Sangyo Co.).

Next, the same ion-exchange membrane was dipped in an aqueous solution containing 1 mol/L of NaCl for not less than 4 hours. Thereafter, the ion-exchange membrane was dried at 60° C. under a reduced pressure for 5 hours, and its dry weight (Dg) was measured. From the above measured values, the ion-exchange capacity of the ion-exchange membrane was found according to the following formula, $$\text{Ion-exchange capacity[meq/g]}=A\text{[eq]}\times 1000/D\text{[g]}$$

6) Burst Strength of the Cation-Exchange Membrane

The cation-exchange membrane was dipped in an aqueous solution containing 0.5 mol/L of NaCl for not less than 4 hours, and was then washed with the ion-exchanged water to a sufficient degree. Next, without drying, the membrane was measured for its burst strength by using the Meullen burst strength tester (manufactured by Toyo Seiki Co.) in compliance with the JIS-P8112.

7) Membrane Resistance of the Cation-Exchange Membrane

The cation-exchange membranes prepared in Examples and in Comparative Examples were each held in a 2-compartment cell having platinum black electrode plates. The cell was filled with an aqueous solution containing 0.5 mol/L of sodium chloride on both sides of the cation-exchange membrane, and the resistance across the electrodes of an AC bridge circuit (frequency of 1,000 cycles per sec.) was measured at 25° C. A difference between the resistance across the electrodes in this case and the resistance across the electrodes measured without installing the cation-exchange membrane was recorded as a membrane resistance.

The cation-exchange membrane used for the above measurement was the one that had been rendered, in advance, to be in an equilibrium state in an aqueous solution containing 0.5 mol/L of sodium chloride.

8) Wet Thickness of the Cation-Exchange Membrane

The cation-exchange membrane was dipped in an aqueous solution containing 0.5 mol/L of NaCl for not less than 4 hours. Thereafter, the water on the surfaces of the membrane was wiped away with a tissue paper, and the membrane was measured for its thickness by using a micrometer MED-25PJ (manufactured by Mitsutoyo Co.).

9) Arithmetic Mean Roughness (Ra) of the Surface of the Cation-Exchange Membrane By using an ultradeep profile microscope VK-8700 (manufactured by Keyence Corp.), the surfaces of the sample membranes were observed through a 100-power objective lens. Images were synthesized based on the light quantity data and the color data of a CCD camera. At the same time, surface ruggedness data were also obtained. A suitable place of a length of about 100 µm free of impurity was selected. A roughness curve f(x) was found from the ruggedness data of the above place, and a mean roughness Ra along the center line was found from the following formula (1). The operation was repeated several times, and it was confirmed that the error was within ±5%.

$$Ra = \frac{1}{f} \cdot \int_0^l |f(x)|dx$$

10) Amount of Catalyst

The cation-exchange membrane that has been treated with a catalyst was subjected to the X-ray fluorometric analysis to find a molar ratio of sulfur element and catalyst element. The amount of the catalyst was calculated from a ratio of the sulfur element relative to the ion-exchange capacity.

Example 1

1. Preparation of the Cation-Exchange Base Membrane
   The following polymerizable composition was prepared.

| | |
|---|---|
| Styrene | 58 parts by mass, |
| Chloromethylstyrene | 4 parts by mass, |
| Divinylbenzene (purity: 57%, the remainder being ethyl vinyl benzene) | 9 parts by mass, |
| Acrylonitrile | 29 parts by mass, |
| Di-t-butyl peroxide | 1 part by mass, |
| Tributyl acetylcitrate | 17 parts by mass, |
| Ethylene glycol diglyciyl ether 1 part by weight, and Polyvinyl chloride powder (Crash Berg flexible temperature: 68° C., chlorine content: 57%, average polymerization degree: 1,060, average particle size: 1 µm) | 65 parts by mass. |

In the above polymerizable composition, a polyethylene woven fabric (50 denier, mesh vertical:lateral 156:100/inch, monofilament, filament diameter 86 µm, melting point 125° C.) was dipped under the atmospheric pressure at 25° C. for 10 minutes. Thereafter, the woven fabric was taken out from the polymerizable composition and was coated on both sides thereof with the Teijin Tetron Film (type S, polyethylene terephthalate) manufactured by Teijin-Du Pont Film Co., 188 µm in thickness as a peeling material. The woven fabric was then polymerized by being heated at 120° C. for 5 hours under a nitrogen pressure of 0.3 MPa. One surface of the obtained membrane was treated with a sand-paper; i.e., there was obtained the membrane having Ra=1.2 µm. Next, the thus obtained membrane was dipped in a mixture of sulfuric acid of a concentration of 98% and chlorosulfonic acid of a purity of not less than 90% at a weight ratio of 1:1 maintaining a temperature of 40° C. for 60 minutes to thereby obtain a sulfonic acid type cation-exchange membrane. The obtained cation-exchange membrane possessed an ion-exchange capacity of 1.9 meq/g, a burst strength of 0.4 MPa and a membrane resistance of 3.0 Ω·cm². Further, the mass of the woven fabric was subtracted from the dry mass of the cation-exchange membrane to find the content of the cation-exchange resin, and the amount of the polyvinyl chloride in the exchange base resin was found from the composition ratio of the above amount of the cation-exchange resin and the polymerizable composition to be 24%. The constitution of the cation-exchange base membrane and properties thereof were as shown in Table 1.

2. Imparting the Hydrolyzing Catalyst
   The obtained cation-exchange membrane was dipped in an aqueous solution containing 2.0 wt % of ruthenium chloride for 60 minutes. The cation-exchange membrane was then taken out therefrom and was dried at 60° C.

3. Preparation of a Solution for Forming the Anion-Exchange Membrane
   100 Grams of a styrene type block copolymer comprising a polystyrene segment (65% by mass) and a polyisoprene segment (35% by mass) that has been hydrogenated was dissolved in 1,000 g of a chloroform and to which were added 100 g of a chloromethylmethyl ether and 10 g of tin chloride to prepare a reaction solution. The reaction solution was stirred at 40° C. for 15 hour. After the stirring, methanol was added to the reaction solution, and the precipitated solid material was picked up by filtering. The obtained solid material was washed and was then dried. As a result, there was obtained a chloromethylated styrene type block copolymer. Next, the chloromethylated polystyrene of a molecular weight of 5,000 was mixed with the above chloromethylated styrene type block copolymer to obtain a mixture containing the chloromethylated polystyrene at a ratio of 40% by mass. The mixture was dissolved in a tetrahydrofuran to obtain a solution containing 25% by mass of the chloromethylated polymer. To the solution was added 8% by mass of an N,N,N',N'-tetramethyl-1,6-hexanediamine to prepare a solution for forming the anion-exchange membrane that contains the anion-exchange resin precursor resin and the anion-exchange group introducing agent.

4. Preparation of the Bipolar Membrane

The solution for forming the anion-exchange membrane prepared as described above was applied onto the roughened surface of the cation-exchange membrane, and was dried at 50° C. for 30 minutes. As a result, there was obtained a bipolar membrane having the anion-exchange membrane of a thickness of 70 μm.

Separately, further, the solution for forming the anion-exchange membrane that was the same as the one used for forming the bipolar membrane, was applied onto a polyethylene terephthalate film and was dried. The membrane formed on the polyethylene terephthalate film was peeled off the film to thereby obtain an anion-exchange membrane for measuring the ion-exchange capacity. The anion-exchange membrane was measured for its ion-exchange capacity to be 1.4 meq/g.

The obtained bipolar membrane was evaluated for its adhesiveness, amount of catalyst, bipolar voltage, hydrolytic efficiency and gluconic acid leakage rate (60° C.). The constitution of the bipolar membrane and the evaluated properties thereof were as shown in Table 2.

Examples 2 to 5

Bipolar membranes were prepared according to the same procedure as that of Example 1 but changing the kind and amount of the polyvinyl chloride which was the polymerizable monomer used for preparing the cation-exchange base membrane as shown in Table 1. The constitutions and properties of the cation-exchange base membranes were as shown in Table 1 while the constitutions and properties of the bipolar membranes were as shown in Table 2.

Example 6

A bipolar membrane was obtained according to the same procedure as that of Example 1 but treating the cation-exchange membrane obtained in Example 1 with an aqueous solution containing 2.0 wt % of tin chloride (II) instead of treating the cation-exchange membrane with the ruthenium chloride aqueous solution. The constitution and properties of the bipolar membrane were as shown in Table 2.

Example 7

Onto the roughened surface of the cation-exchange membrane treated with the ruthenium chloride aqueous solution obtained in Example 1, there was applied a solution obtained by dissolving, in a tetrahydrofuran, 15 wt % of a partly aminated polystyrene having a quaternary ammonium base-exchange capacity of 0.9 meq/g followed by drying at room temperature. As a result, there was obtained a bipolar membrane having a partly aminated polystyrene layer of a thickness of 70 μm. The constitution and properties of the bipolar membrane were as shown in Table 2.

The partly aminated polystyrene was synthesized as described below. First, a monomer mixture of styrene and chloromethylstyrene at a molar ratio of 10:1 was copolymerized in toluene in the presence of a benzoyl peroxide that was a polymerization initiator at 70° C. for 10 hours. The obtained reaction solution was poured into methanol, and the precipitated styrene-chloromethylstyrene copolymer was recovered. An N,N,N',N'-tetramethyl-1,2-ethanediamine was acted on the chloromethyl group of the copolymer to introduce quaternary ammonium base, and there was obtained a partly aminated polystyrene.

Example 8

The chloromethylated polymer solution obtained in Example 1 was applied onto the roughened surface of the cation-exchange membrane treated with the ruthenium chloride aqueous solution obtained in Example 1 followed by drying to thereby form a chloromethylated polymer film of a thickness of 60 μm. Thereafter, the cation-exchange membrane having the chloromethylated polymer film was dipped in a methanol solution of an N,N,N',N'-tetramethyl-1,3-propanediamine (10% by mass) at 30° C. for 50 hours. The cation-exchange membrane was, thereafter, washed with water to a sufficient degree, and there was obtained a bipolar membrane. The constitution and properties of the bipolar membrane were as shown in Table 2.

Example 9

A bipolar membrane was prepared according to the same procedure as that of Example 1 but changing the polyolefin reinforcing member and the polymerization temperature for preparing the cation-exchange base membrane into those shown in Table 1 and using a 1,1,3,3-tetramethylbutylhydroperoxide as the polymerization initiator. The constitution and properties of the cation-exchange base membranes were as shown in Table 1 while the constitution and properties of the bipolar membrane were as shown in Table 2.

Example 10

A bipolar membrane was prepared according to the same procedure as that of Example 1 but changing the polyolefin reinforcing member used for preparing the cation-exchange base membrane into the one shown in Table 1. The constitution and properties of the cation-exchange base membranes were as shown in Table 1 while the constitution and properties of the bipolar membrane were as shown in Table 2.

Comparative Example 1

A bipolar membrane was prepared according to the same procedure as that of Example 1 but changing the polymerization temperature to 80° C. at the time of preparing the cation-exchange base membrane and using a t-butyl-2-ethylperoxyhexanoate as the polymerization initiator. The constitution and properties of the cation-exchange base membranes were as shown in Table 1 while the constitution and properties of the bipolar membrane were as shown in Table 2.

Comparative Example 2

A bipolar membrane was prepared according to the same procedure as that of Example 1 but preparing the cation-exchange base membrane without adding the polyvinyl chloride that was the polymerizable monomer. The constitution and properties of the cation-exchange base membranes were as shown in Table 1 while the constitution and properties of the bipolar membrane were as shown in Table 2.

Comparative Example 3

A bipolar membrane was prepared according to the same procedure as that of Example 1 but preparing the cation-exchange base membrane by using a chlorinated polyethylene (average molecular weight of 20,000, chlorine content of 66%) in an amount as shown in Table 1 instead of using the polyvinyl chloride, executing the polymerization at 80° C. and using the t-butyl-2-ethylperoxyhexanoate as the polymerization initiator. The constitution and properties of the cation-exchange base membranes were as shown in Table 1 while the constitution and properties of the bipolar membrane were as shown in Table 2.

Comparative Example 4

A bipolar membrane was prepared according to the same procedure as that of Example 1 but preparing the cation-exchange base membrane by using the chlorinated polyethylene (average molecular weight of 20,000, chlorine content of 66%) in an amount as shown in Table 1 instead of using the polyvinyl chloride.

The constitution and properties of the cation-exchange base membranes were as shown in Table 1 while the constitution and properties of the bipolar membrane were as shown in Table 2.

TABLE 1

| | Cation-exchange membrane composition | | | | Properties of the cation-exchange membrane | | | | | |
|---|---|---|---|---|---|---|---|---|---|---|
| | Adhesive resin | *1 (parts by mass) | Reinforcing member | Polymer-ization temp. (° C.) | Ion-exchange capacity (meq/g) | Burst strength (MPa) | Membrane resistance (Ω cm²) | *2 (μm) | Ra (μm) | *3 (% by mass) |
| Ex. 1 | PVC1 | 65 | PE1 | 120 | 1.9 | 0.4 | 3.0 | 210 | 1.2 | 24 |
| Ex, 2 | PVC2 | 120 | PE1 | 120 | 1.5 | 0.5 | 4.9 | 198 | 1.2 | 34 |
| Ex, 3 | PVC2 | 200 | PE1 | 120 | 0.7 | 0.5 | 8.8 | 190 | 1.2 | 42 |
| Ex. 4 | PVC1 | 45 | PE1 | 120 | 2.2 | 0.4 | 2.8 | 215 | 1.2 | 18 |
| Ex. 5 | PVC1 | 25 | PE1 | 120 | 2.4 | 0.4 | 2.5 | 224 | 1.2 | 12 |
| Ex. 9 | PVC1 | 65 | PP | 150 | 1.9 | 0.6 | 3.0 | 213 | 1.0 | 24 |
| Ex. 10 | PVC1 | 65 | PE2 | 120 | 2.1 | 0.3 | 2.0 | 145 | 1.1 | 30 |
| Comp. Ex. 1 | PVC1 | 65 | PE1 | 80 | 1.9 | 1.3 | 2.7 | 215 | 1.2 | 24 |
| Comp. Ex. 2 | — | 0 | PE1 | 120 | 2.6 | 0.4 | 2.0 | 236 | 1.2 | — |
| Comp. Ex. 3 | CPE | 25 | PE1 | 80 | 2.4 | 1.3 | 2.5 | 218 | 1.2 | 12 |
| Comp. Ex. 4 | CPE | 25 | PE1 | 120 | 2.4 | 0.4 | 2.5 | 218 | 1.2 | 12 |

PVC1: Polyvinyl chloride, chlorine content 57%, average polymerization degree 1060
PVC2: Polyvinyl chloride, chlorine content 57%, average polymerization degree 1200
CPE: Chlorinated polyethylene, chlorine content 66%, average polymerization degree 20,000
PE1: Polyethylene woven fabric (monofilament, filament diameter 50 denier = 86 μm, mesh vertical:lateral 156/100/inch, melting point: 125° C.)
PP: Polypropylene woven fabric (monofilament, filament diameter 50 denier = 87 μm, mesh vertical:lateral 156/100/inch, melting point: 165° C.)
PE2: Polyethylene woven fabric (monofilament, filament diameter 30 denier = 67 μm, mesh vertical:lateral 100/100/inch, melting point; 125° C.)
*1 Amount of the adhesive resin in the polymerizable composition used for forming the cation-exchange base membrane
*2 Thickness of wet membrane
*3 Content of the adhesive resin in the cation-exchange membrane

TABLE 2

| | Anion-exchange membrane composition | | | Catalyst layer composition | | Properties of the bipolar membrane | | | |
|---|---|---|---|---|---|---|---|---|---|
| | Resin species | *1 | Ion-exchange capacity (meq/g) | Catalyst species | Amount of catalyst (mg/m²) | *2 (%) | *3 (V) | *4 (%) | *5 (%) |
| Ex. 1 | CMPS/CMSEPS | TMHDA | 1.4 | Ru | 500 | 0 | 1.1 | 99.3 | 0.3 |
| Ex. 2 | CMPS/CMSEPS | TMHDA | 1.4 | Ru | 300 | 0 | 1.3 | 99.5 | 0.3 |
| Ex. 3 | CMPS/CMSEPS | TMHDA | 1.4 | Ru | 100 | 0 | 1.5 | 99.5 | 0.2 |
| Ex. 4 | CMPS/CMSEPS | TMHDA | 1.4 | Ru | 600 | 9 | 1.1 | 99.1 | 0.6 |
| Ex. 5 | CMPS/CMSEPS | TMHDA | 1.4 | Ru | 650 | 19 | 1.0 | 99.0 | 0.9 |
| Ex. 6 | CMPS/CMSEPS | TMHDA | 1.4 | Sn | 550 | 0 | 1.1 | 99.3 | 0.3 |
| Ex. 7 | SCMS | TMEDA | 0.9 | Ru | 500 | 0 | 1.3 | 99.4 | 0.3 |
| Ex. 8 | CMPS/CMSEPS | TMPDA | 1.4 | Ru | 500 | 12 | 1.2 | 99.3 | 0.3 |
| Ex. 9 | CMPS/CMSEPS | TMHDA | 1.4 | Ru | 400 | 0 | 1.2 | 99.2 | 0.7 |

TABLE 2-continued

| | Anion-exchange membrane composition | | | Catalyst layer composition | | Properties of the bipolar membrane | | | |
| | | | Ion-exchange capacity (meq/g) | | Amount of | | | | | |
| Resin species | *1 | | | Catalyst species | catalyst (mg/m$^2$) | *2 (%) | *3 (V) | *4 (%) | *5 (%) |
|---|---|---|---|---|---|---|---|---|---|---|
| Ex. 10 | CMPS/CMSEPS | TMHDA | 1.4 | Ru | 450 | 0 | 1.0 | 99.0 | 0.6 |
| Comp. Ex. 1 | CMPS/CMSEPS | TMHDA | 1.4 | Ru | 500 | 0 | 1.0 | 97.9 | 1.9 |
| Comp. Ex. 2 | CMPS/CMSEPS | TMHDA | 1.4 | Ru | 1000 | 100 | 5.1 | 97.8 | 1.7 |
| Comp. Ex, 3 | CMPS/CMSEPS | TMHDA | 1.4 | Ru | 700 | 0 | 1.2 | 97.2 | 3.0 |
| Comp. Ex. 4 | CMPS/CMSEPS | TMHDA | 1.4 | Ru | 700 | 100 | 5.2 | 99.1 | 0.8 |

CMPS: Chloromethylated polystyrene
CMSEPS: Chloromethylated styrene type block copolymer
SCMS: Styrene-chloromethylstyrene copolymer
TMHDA: N,N,N',N'-tetramethyl-1.6-hexanediamine
TMEDA: N,N,N',N'-tetramethyl-1.2-ethanediamine
TMPDA: N,N,N',N'-tetramethyl-1.3-propanediamine
*1 Anion-exchange group introducing agent
*2 Peeled area
*3 Bipolar voltage
*4 Hydrolyzing efficiency
*5 Gluconic acid leakage ratio

The invention claimed is:

1. A method of producing a bipolar membrane including a step of forming a cation-exchange membrane, and a step of forming an anion-exchange membrane on the surface of said cation-exchange membrane; wherein the step of forming said cation-exchange membrane includes:

a step of impregnating a polyolefin reinforcing member with a polymerizable composition obtained by mixing a polyvinyl chloride (A) and a polymerization-curable component(B) that contains a monomer (b1) having a cation-exchange group or a monomer (b2) having a reaction group capable of introducing a cation-exchange group; and a step of forming a membrane of a cation-exchange resin that contains the polyvinyl chloride or of a cation-exchange resin precursor resin by polymerization-curing said polymerizable composition at a temperature of not lower than 100° C.; and, further, as required, a step of introducing a cation-exchange group into the cation-exchange resin precursor resin.

2. The method of producing the bipolar membrane according to claim 1, further including:

a step of impregnating a polyolefin reinforcing member with the polymerizable composition obtained by mixing the polyvinyl chloride (A) and the monomer (b1) having a cation-exchange group; and a step of forming a membrane of the cation-exchange resin that contains the polyvinyl chloride by the polymerization curing at a temperature of not lower than 100° C.

3. The method of producing the bipolar membrane according to claim 1, further including:

a step of impregnating a polyolefin reinforcing member with the polymerizable composition obtained by mixing the polyvinyl chloride (A) and the monomer (b2) having a reaction group capable of introducing a cation-exchange group;

a step of forming the membrane of said cation-exchange resin precursor resin by the polymerization curing at a temperature of not lower than 100° C.; and a step of introducing a cation-exchange group by acting a cation-exchange group introducing agent upon said cation-exchange resin precursor resin.

4. The method of producing the bipolar membrane according to claim 1, wherein the step of forming the anion-exchange membrane on the surface of said cation-exchange membrane includes:

a step of applying a polar organic solvent solution of the anion-exchange resin on the surface of said cation-exchange membrane; and a step of removing the polar organic solvent.

5. The method of producing the bipolar membrane according to claim 1, wherein the step of forming the anion-exchange membrane on the surface of said cation-exchange membrane includes:

a step of applying, on the surface of said cation-exchange membrane, a polar organic solvent solution of an anion-exchange resin precursor resin having a reaction group capable of introducing the anion-exchange group;

a step of forming a membrane of said anion-exchange resin precursor resin on the surface of said cation-exchange membrane by removing the polar organic solvent; and a step of introducing the anion-exchange group into said anion-exchange resin precursor resin.

6. The method of producing the bipolar membrane according to claim 1, wherein the step of forming the anion-exchange membrane on the surface of said cation-exchange membrane includes:

a step of applying, on the surface of said cation-exchange membrane, a polar organic solvent solution that contains an anion-exchange resin precursor resin having a reaction group capable of introducing the anion-exchange group and an anion-exchange group introducing agent; and a step of removing the polar organic solvent.

* * * * *